Dec. 31, 1968  S. B. WELCH  3,419,428
METHOD OF LOOSENING FOOD SOIL FROM WALLS OF DOMESTIC OVEN
Filed Nov. 9, 1964

| HEAT OVEN BETWEEN ABOUT 550°F AND 650°F |
| SUBJECT GASEOUS PRODUCTS TO CATALYTIC OXIDATION |
| COOL OVEN TO ABOUT ROOM TEMPERATURE |
| SEAL OVEN TO PREVENT AIR FLOW THERETHROUGH |
| INTRODUCE MIXTURE OF AMMONIA GAS AND STEAM INTO OVEN |

INVENTOR.
STANLEY B. WELCH
BY Richard L. Caslin
HIS ATTORNEY

United States Patent Office 3,419,428
Patented Dec. 31, 1968

3,419,428
METHOD OF LOOSENING FOOD SOIL FROM WALLS OF DOMESTIC OVEN
Stanley B. Welch, Louisville, Ky., assignor to General Electric Company, a corporation of New York
Filed Nov. 9, 1964, Ser. No. 409,688
2 Claims. (Cl. 134—22)

ABSTRACT OF THE DISCLOSURE

This invention is incorporated with a baking oven having an access door for closing the oven. Special heating means are provided for raising the temperature within the oven above normal cooking temperatures to a range between about 550° F. and 650° F. Food soil and grease spatter tend to accumulate on the walls forming the oven cavity during the various cooking operations. An important method step in the present invention is to raise the oven temperature above the normal cooking temperatures so as to thoroughly bake-on the grease. The oven is provided with a catalytic oxidation unit adjacent the oven exhaust vent which operates to degrade the smoke, odors and vapors generated during the over-temperature, bake-on operation. Then the oven is allowed to cool down to about room temperature. Next, the oven exhaust vent is closed and with the oven door also closed, the oven cavity is substantially sealed. Finally, a mixture of ammonia gas and steam is introduced into the oven to condense upon the relatively cool walls forming the oven cavity. This treatment tends to loosen the oven soil to a point where it can easily be removed from the oven.

---

The present invention relates to domestic ovens and particularly to a method invention for loosening food soil and grease spatter that has become lodged on the inner walls of the oven cavity during normal cooking operations.

This invention is related to the apparatus invention in the copending application of Christian A. Eff, Ser. No. 409,689 now Patent No. 3,331,943 which was filed concurrently herewith and is assigned to General Electric Company, the assignee of the present invention. The invention of the subject application relates to the method steps of loosening the food soil, while the invention in the copending Eff application relates to one preferred apparatus which may be used for carrying out the method steps of the present invention.

Probably the major annoyance to the housewife in using an oven is the difficulty encountered in keeping the walls of the oven cavity clean. During the normal cooking operations, food particles and grease spatterings often drop upon the hot surfaces of the oven liner and door where they are partially burned so that they not only change color to a dark brown but what is far more objectionable they adhere tenaciously to the surfaces. Strong cleaning agents have been provided for application to the oven walls for the express purpose of removing food soils from them, but even the best of these cleaning agents require the housewife to exert a strong rubbing action, and it is always very difficult to reach some of the more inaccessible parts of the oven.

It has been a common practice for many years for the housewife to place a large bowl of hot water and household ammonia within her oven after the walls thereof have become heavily soiled. The walls of the oven cavity would be at room temperature, and the bowl of household ammonia was usually left in the oven overnight so that the solution would evaporate slowly and condense on the oven walls. This procedure does not automatically eliminate the soil from the oven liner, door and racks, but it does tend to loosen the soil to a considerable degree.

Another popular solution to this problem is taught in the Brite Patent 3,051,559 which describes a small disposable container holding a supply of an ammonia generating material so that hot water may be poured into the container to melt the wax plug 25 and permit the water to seep into contact with the ammonium chloride and calcium oxide mixture thus generating ammonia gas and steam which circulate throughout the oven cavity and condense on the cold walls thereof.

The principal object of the present invention is to provide a novel method of operating a domestic oven in combination with an ammonia gas and steam generator so as to optimize the loosening of food soil from the walls of the oven.

A further object of the present invention is to outline the various method steps for operating a domestic oven in conjunction with a vaporized solvent for loosening food soil from the walls of the oven cavity.

A further object of the present method invention is to prepare the food soil for a later attack from a vaporized solvent by first converting the food soil to a hardened film by raising the oven temperature above normal cooking temperatures to a range somewhere between about 550° F. and 650° F.

A still further object of the present method invention is to operate a domestic oven in such a way that a mixture of ammonia gas and steam will penetrate the food soil and wet the underlying supporting surface so that the soil will tend to peel off the supporting surface.

The present method invention may be described as embodying the following steps of first raising the oven temperature above normal cooking temperatures to a range somewhere between about 550° F. and 650° F. so as to harden to food soil on the walls of the oven cavity. This heat treatment will cause the generation of gaseous degradation products including smoke, odors, and vapors, and these are all subjected to a catalytic oxidation step before they are returned to the kitchen atmosphere. Next, the oven temperature is reduced to about normal room temperature. Then the oven cavity is sealed to substantially prevent the flow of air through the oven, and finally a mixture of ammonia gas and steam is introduced into the oven simultaneously to condense upon the relatively cool walls thereof.

My invention will be better understood from the following description taken in conjunction with the accompanying drawing and its scope will be pointed out in the appended claims.

Figure 1:
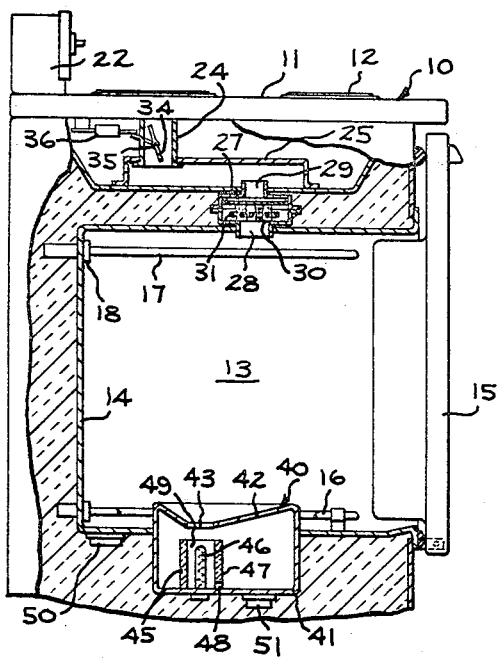
FIGURE 1 is a fragmentary left side elevational view partly in cross-section showing one example of an electric range in which the present method invention may be practiced.
Figure 2:
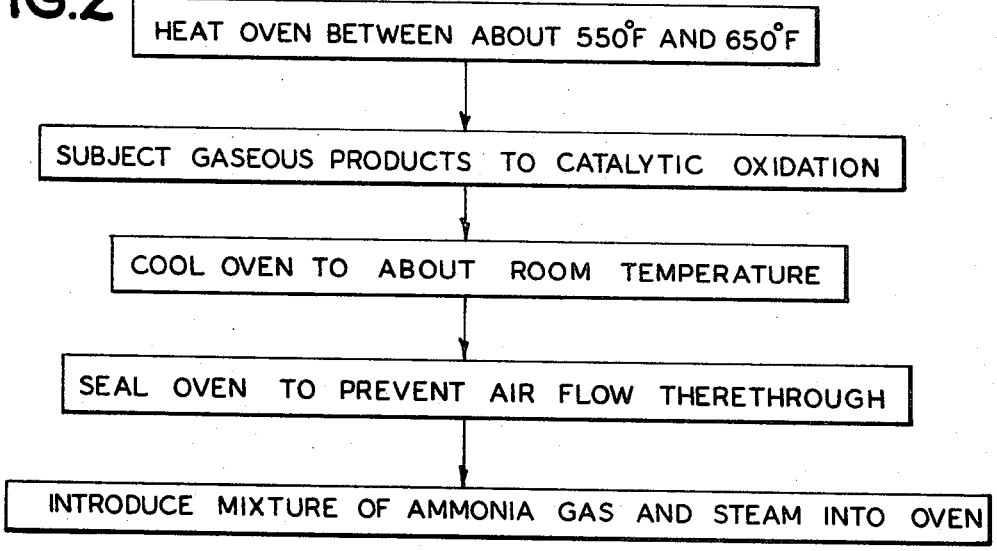
FIGURE 2 is a visual chart of the various method steps for practicing the present invention.

Turning now to a consideration of the drawing, and in particular to FIGURE 1, there is shown for illustrative purposes an electric range cabinet or body 10 having a top cooking surface or cooktop 11 with a plurality of surface heating elements 12, an oven cavity 13 located directly beneath the cooktop 11 and formed by a box-like oven liner 14 cooperating with a front-opening drop door 15. The oven cavity is supplied with two standard heating elements; namely, a lower baking element 16 and an upper broiling element 17. Each oven heating element is of circuitous shape formed by a metal-sheathed resistance heater having terminal neds supported as at 18 at the back wall of the oven liner 14. Suitable thermal insulation such as fiberglass 20 or the like surrounds the oven liner to confine the heat developed by the heating unit in the oven cavity for a more efficient utilization of the heating energy as well as to retain the oven body at a relatively cool temperature which would not be injurious or uncomfortable to the human touch.

The range is provided along the back edge of the cooktop 11 with a raised backsplash 22 which contains the various circuit control elements such as switches, thermostats, clock-timers, thermometers, pilot lights, etc., which would enable the housewife to control the various heating elements of both the cooktop and oven.

The oven cavity 13 is provided with an exhaust or venting ssytem in the top wall of the oven liner 14 in the form of an oven vent 24 of generally cylindrical shape that cooperates with horizontal ducting 25 to carry the oven exhaust beneath the cooktop 11 and out an opening (not shown) in the cooktop beneath one of the surface heating elements 12 as is the general practice in this art. A desirable feature to be added to the standard oven venting system is a catalytic oxidation unit 27 which is shown interposed in the ducting 25 between the oven vent 24 and the surface heating element 12 to prevent the return to the kitchen atmosphere of any smoke, odor, and noxious vapors that might be generated within the oven during one of the high temperature method steps on the order of 600° F. which is above the normal cooking temperature range of between about 150° F. and 550° F.

A suitable catalytic oxidation unit is disclosed in the U.S. Patent of the present inventor No. 2,900,483 granted on Aug. 18, 1959 and assigned to General Electric Company, the same assignee as is the present invention. This oxidation unit is shown as a hollow cannister having a lower inlet opening 28 and an upper outlet opening 29. The interior of the cannister includes a spirally wound catalytic platinum surface of wire screen structure 30 and a coiled heating element 31 inter-leaved therewith to maintain the screen at a temperature of about 1300° F. so that the hot oven gases will catalytically oxidize on the platinum surface.

As mentioned previously, the oven cavity 13 is provided with an oven vent 24 adjacent the top wall thereof. It is considered best to close this vent during the vaporizing cycle so as to increase the speed and efficiency of the cycle, while substantially preventing the escape of ammonia gas into the kitchen which might otherwise render impossible the use of the kitchen during the cycle because of the high concentration of ammonia. One possible solution to this oven sealing problem is shown in FIGURE 1, in the form of a butterfly damper 34 which is pivotally mounted on a supporting shaft 35 so that during normal cooking operations the damper is in a substantially longitudinal position serving to open the vent as far as possible, while during the vaporizing cycle the damper will be moved through an angle of about 90° where it will substantially seal the vent and prevent the flow of air through the oven. Cooperating with the damper is an electroresponsive actuator in the form of a heated bimetal 36 that is supported in cantilevel fashion and operatively connected with the shaft of the damper 34 to swing the damper into a closed position in the oven vent 24.

While it is possible to practice the present invention using several different types of ammonia gas and steam generators, one specific type is illustrated and will be described in order to present a clear understanding of an operable system which could be adopted to practice the present invention. The particular vaporizing generator shown is one devised by Christian A. Eff and disclosed in his copending application, Ser. No. 409,689 which was mentioned above. The vaporizer means is a self-contained unit 40 shown as built into the bottom wall of the oven liner 14 and comprising a metal container 41 with a depressed or funnel-shaped cover 42 having a small inlet opening 43 at the bottom of the depression for ease in filling the container prior to the operation of the unit. This unit 40 has been drawn out of proportion on an enlarged scale for the sake of clarity. In actual practice the container need only hold two or three cups of solution.

A small flash boiler 45 is included in the container and it comprises a resistance heating element 46 of about 300 watts that is surrounded by a cup-shaped insulating shroud 47. The lower portion of the shroud has a small opening 48 so that liquids in the container 41 may flow readily between the boiler and the container and thereby maintain the same liquid level. The shroud 47 is of generally cylindrical shape with an open top portion 49 located directly beneath the opening 43 in the top cover 42. The purpose of this insulating shroud 47 is to thermally insulate the heating element 46 of the boiler from the bulk of the solvent in the container 41 so that the solvent in the container stays relatively cool until it passes into the boiler unit. This has been found to be of importance because neither the ammonia gas alone nor the steam alone has much effect in loosening the food soil. However, when both the ammonia gas and steam are present at the same time within the oven cavity remarkably successful results can be obtained by the practice of the present invention.

Figure 3:
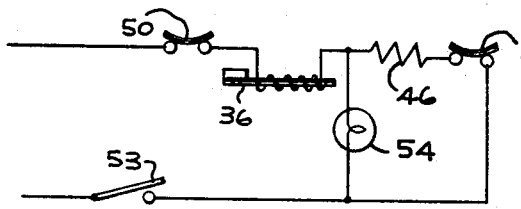
FIGURE 3 is a schematic wiring diagram of the control means for the vaporizing system of the oven of FIGURE 1 for loosening the soil from the inner walls thereof.

It has been recognized that the temperature of the walls of the oven cavity must be at approximately room temperature so that the mixture of ammonia gas and steam may condense thereon. This objective is fulfilled by providing a normally-closed thermostat 50 in heat transfer relationship with the oven liner 14 and in a series circuit with the heating element 46 of the vaporizing unit as seen in FIGURE 3 so that at temperatures above about 110° F. the switch contacts of the thermostat 50 will be opened to de-energize the heating element 46.

It is also well to provide an automatic safety cut-off means for the vaporizing unit in the event the supply of liquid solvent has been depleted in the container 41 so as to prevent excessive temperatures as well as to reduce the waste of electricity once the vaporizing means becomes inoperative. Such a safety means is provided by a second normally-closed thermostat 51 that is positioned in heat transfer relationship with the container 41 and also connected in series circuit with the heating element 46 as is best shown in FIGURE 3. Hence, this thermostat 51 will cycle on and off at around 212° F. once the supply of solvent in the boiler is exhausted, thereby holding down the maximum temperature of the vaporizing unit within reasonable limits.

Also mentioned previously was the heated bimetal 36 for actuating the damper 34. This heated bimetal is an electroresponsive means that is adapted to be connected in series circuit with the heating element 46 of the vaporizing unit so as to operate concurrently therewith. The operating circuit for the vaporizer also includes an on-off switch 53 thereby giving the housewife manual control over the vaporizer. Also, it is well to have a visual indication of the operability of the vaporizing cycle, and this function is provided by a pilot light 54 connected in parallel across the heating element 46 and operable whenever the on-off switch 53 is closed and the temperature of oven liner is in the vicinity of room temperature as would be evidenced by the closed condition of the thermostat 50.

Having described above a typical apparatus that may be employed for the practice of this method invention the various steps in the method which have been found expedient in the preferred embodiment of the present invention will now be explained. In the event of excessive overloads of food soil and grease in the oven it would be wise to remove the excess by hand by wiping the bottom wall with a paper towel or wet sponge. In the event of normal loads of soil, the oven is first heated to approximately 600° F. or within a temperature range somewhere between about 550° F. and 650° F. to bake-on or convert the soil to a hardened film to a greater extent than is possible during normal cooking temperatures. This step is considered to be one of the key steps in the method, and one which later brings about the unobvious result that have been observed and which would not have been predicted by those skilled in this art. During this high temperature operation of the oven veritable clouds of smoke, odors and vapors might be developed and they should be oxidized before being exhausted from the oven and returned to the kitchen atmosphere. Such a treatment takes the step of catalytically oxidizing the oven exhaust to degrade the gaseous products and eliminate the possibility of spot and carbon monoxide to produce gaseous degradation products which are neither harmful nor noxious.

Next, the oven temperature should be reduced to about room temperature by de-energizing the heating means and perhaps opening the oven door for a short period of time, if time is of the essence. Then the oven is substantially sealed to prevent the flow of ambient air through the oven, and this includes both the closing of the oven door as well as the sealing of the oven vent such as by means of the damper 34.

Finally, a mixture of ammonia gas and steam is admitted to the oven cavity so that it may condense upon the cold walls of the oven liner and inner surface of the door so as to penetrate the film of soil and wet the underlying oven walls and spread out thereover. Hence, upon the return of the oven temperature to normal room temperature and the escape of the vapor mixture the film of soil breaks up and appears to peel away from the supporting walls. From here the soil may be removed by the use of a vacuum cleaner or by wiping the walls with a damp sponge.

Modifications of this invention will occur to those skilled in this art, therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. A method of loosening food soil and grease spatter from the interior surfaces of an oven liner and access door that define an oven cooking cavity, said method comprising the steps of supplying heat into the oven cavity and raising the temperature above normal cooking temperatures to between about 550° F. and 650° F. so as to bake the food soil and grease into a hardened film on the said interior surfaces, simultaneously operating a catalytic oxidation unit to degrade any noxious gaseous products generated by the high temperature heating step, then lowering the oven temperature to approximately room temperature, and introducing a mixture of ammonia gas and steam into the oven cavity to condense on the interior surfaces.

2. The method of loosening food soil and grease spatter from walls of a domestic oven, said method comprising the steps of supplying heat to the oven cavity and raising the temperature above normal cooking temperatures to between about 550° F. and 650° F. so as to bake the food soil and grease onto the said walls in a hardened film while causing the generation of gaseous degradation products including smoke and odors and vapors, subjecting these gaseous products to catalytic oxidation and exhausting them to the exterior of the oven, terminating the supply of heat and allowing the temperature in the oven to subside to about normal room temperature, sealing the oven to substantially prevent the flow of air therethrough, and introducing a mixture of ammonia gas and steam into the cool oven for a period of time to condense the mixture onto the oven walls.

References Cited

UNITED STATES PATENTS

| 2,004,796 | 6/1935 | Payne | 134—20 |
| 2,443,373 | 6/1948 | Borsoff | 134—20 |
| 3,196,046 | 7/1965 | Brite | 134—39 X |

FOREIGN PATENTS

| 28,616 | 2/1957 | Finland. |

HARRY B. THORNTON, *Primary Examiner.*

R. HALPER, *Assistant Examiner.*

U.S. Cl. X.R.

134—30, 36, 39